United States Patent
Kamma (10) Patent No.: US 9,575,695 B2
(45) Date of Patent: Feb. 21, 2017

(54) IMAGE RECORDING APPARATUS HAVING AN IMPROVE USABILITY OF THE APPARATUS IN THE EVENT OF AN OCCURRENCE OF AN ERROR

(71) Applicant: BROTHER KOGYO KABUSHIKI KAISHA, Nagoya-shi, Aichi-ken (JP)

(72) Inventor: Yui Kamma, Kasugai (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 15/044,246

(22) Filed: Feb. 16, 2016

(65) Prior Publication Data

US 2016/0253126 A1     Sep. 1, 2016

(30) Foreign Application Priority Data

Feb. 26, 2015 (JP) ................... 2015-036936

(51) Int. Cl.
| | | |
|---|---|---|
| *G06F 3/12* | (2006.01) | |
| *H04N 1/21* | (2006.01) | |
| *G06K 15/00* | (2006.01) | |

(52) U.S. Cl.
CPC ............. *G06F 3/121* (2013.01); *G06F 3/1259* (2013.01); *G06F 3/1285* (2013.01); *H04N 1/2104* (2013.01); *H04N 2201/218* (2013.01)

(58) Field of Classification Search
CPC .... G06K 15/00; G06K 15/005; G06K 15/002; G06K 15/822; G06K 15/1821; G06K 15/1817; G05F 3/121; G05F 3/1259; G05F 3/1285; H04N 1/2104; H04N 2201/218

USPC  358/1.1, 1.9, 1.13, 1.14, 1.15, 1.16; 399/81, 85, 88

See application file for complete search history.

(56) References Cited

U.S. PATENT DOCUMENTS

| | | | |
|---|---|---|---|
| 6,897,972 B1* | 5/2005 | Noda ...................... | G06K 15/02 358/1.15 |
| 2005/0157325 A1* | 7/2005 | Choi ................... | G06F 11/0733 358/1.14 |
| 2007/0041033 A1 | 2/2007 | Funahashi | |
| 2009/0002733 A1* | 1/2009 | Kakigi .................. | G06F 3/1296 358/1.9 |

(Continued)

FOREIGN PATENT DOCUMENTS

| | | |
|---|---|---|
| JP | 2000-347818 A | 12/2000 |
| JP | 2007-050653 A | 3/2007 |

*Primary Examiner* — Gabriel Garcia
(74) *Attorney, Agent, or Firm* — Scully, Scott, Murphy & Presser, PC (57) ABSTRACT

An image recording apparatus including a controller for determining whether a recording operation is a first or a second recording operation and for determining whether an error that suspends the recording operation is occurring, wherein when the recording operation is the first recording operation and the error is occurring, the occurrence of the error is kept notified until the error is fixed, wherein when the recording operation is the second recording operation and the error is occurring, the occurrence of the error is kept notified for a predetermined time, wherein the recording operation, the performance of which was suspended by the occurrence of the error, is cancelled after the occurrence of the error has been kept notified for the predetermined time, and wherein the suspended recording operation is performed on condition that the error is fixed in a time period during which the occurrence of the error is kept notified.

14 Claims, 7 Drawing Sheets

(56) References Cited

U.S. PATENT DOCUMENTS

2009/0296125 A1* 12/2009 Kai .................. G06F 3/121
358/1.9

* cited by examiner

IMAGE RECORDING APPARATUS HAVING AN IMPROVE USABILITY OF THE APPARATUS IN THE EVENT OF AN OCCURRENCE OF AN ERROR

CROSS REFERENCE TO RELATED APPLICATION

The present application claims priority from Japanese Patent Application No. 2015-036936, which was filed on Feb. 26, 2015, the disclosure of which is herein incorporated by reference in its entirety.

BACKGROUND

Technical Field

The following disclosure relates to an image recording apparatus configured to perform a recording operation of an image based on image data and a non-transitory storage medium storing instructions executable by a computer of the image recording apparatus.

Description of the Related Art

When an error that suspends performance of a recording operation occurs in an image recording apparatus, the image recording apparatus notifies a user of the occurrence of the error. The user can notice the occurrence of the error owing to the notification and can deal with the error. In a case where the notification of the error continues for a long time, however, the user may feel uncomfortable. In this respect, there is known a technique of controlling the image recording apparatus to stop notifying the error after the error has been notified for a predetermined time.

SUMMARY

In a case where the image recording apparatus stops notifying the error after the error has been notified for the predetermined time according to the technique, there is a risk that the recording operation is kept suspended for a long time without the user noticing the notification of the error. In view of this, the disclosure relates to improvement of usability of the image recording apparatus in the event of an occurrence of an error.

In one aspect of the disclosure, an image recording apparatus includes a recording device configured to record, on a recording sheet, an image based on image data; a notifying device configured to notify an occurrence of an error by generating at least one of a visual notification and an audio notification; and a controller, wherein the controller is configured to execute: a recording-operation performing process in which a recording operation of the image is performed by the recording device according to a recording command for the image; a first determining process in which it is determined whether the recording operation to be performed in the recording-operation performing process is a first recording operation or a second recording operation; a second determining process in which it is determined whether an error that suspends performance of the recording operation of the image by the recording device is occurring, the error being an error which will be fixed by a user of the image recording apparatus; a first notifying process in which, when it is determined in the first determining process that the recording operation to be performed is the first recording operation and it is determined in the second determining process that the error is occurring, the occurrence of the error is kept notified by the notifying device until the error is fixed; a second notifying process in which, when it is determined in the first determining process that the recording operation to be performed is the second recording operation and it is determined in the second determining process that the error is occurring, the occurrence of the error is kept notified by the notifying device for a predetermined length of time; and a cancelling process in which the recording operation, the performance of which was suspended by the occurrence of the error, is cancelled after the occurrence of the error has been kept notified for the predetermined length of time by the notifying device, the cancelling process being executed in a state in which the occurrence of the error has been kept notified by the notifying device in the second notifying process, and wherein the suspended recording operation of the image is resumed, on condition that the error is fixed in a time period during which the occurrence of the error is kept notified by the notifying device in the first notifying process or the second notifying process.

In another aspect of the disclosure, a non-transitory storage medium storing a plurality of instructions executable by a computer of an image recording apparatus, the image recording apparatus including a recording device configured to record, on a recording sheet, an image based on image data; a notifying device configured to notify an occurrence of an error by generating at least one of a visual notification and an audio notification; and a controller, the plurality of instructions, when executed by the computer, causing the controller to perform: a recording-operation performing process in which a recording operation of the image is performed by the recording device according to a recording command for the image; a first determining process in which it is determined whether the recording operation to be performed in the recording-operation performing process is a first recording operation or a second recording operation; a second determining process in which it is determined whether an error that suspends performance of the recording operation of the image by the recording device is occurring, the error being an error which will be fixed by a user of the image recording apparatus; a first notifying process in which, when it is determined in the first determining process that the recording operation to be performed is the first recording operation and it is determined in the second determining process that the error is occurring, the occurrence of the error is kept notified by the notifying device until the error is fixed; a second notifying process in which, when it is determined in the first determining process that the recording operation to be performed is the second recording operation and it is determined in the second determining process that the error is occurring, the occurrence of the error is kept notified by the notifying device for a predetermined length of time; and a cancelling process in which the recording operation, the performance of which was suspended by the occurrence of the error, is cancelled after the occurrence of the error has been kept notified for the predetermined length of time by the notifying device, the cancelling process being executed in a state in which the occurrence of the error has been kept notified by the notifying device in the second notifying process, and wherein the suspended recording operation of the image is resumed, on condition that the error is fixed in a time period during which the occurrence of the error is kept notified by the notifying device in the first notifying process or the second notifying process.

BRIEF DESCRIPTION OF THE DRAWINGS

The objects, features, advantages, and technical and industrial significance of the present disclosure will be better understood by reading the following detailed description of embodiments, when considered in connection with the accompanying drawings, in which.

DETAILED DESCRIPTION OF THE EMBODIMENTS

Configuration of Communication System

Figure 1:
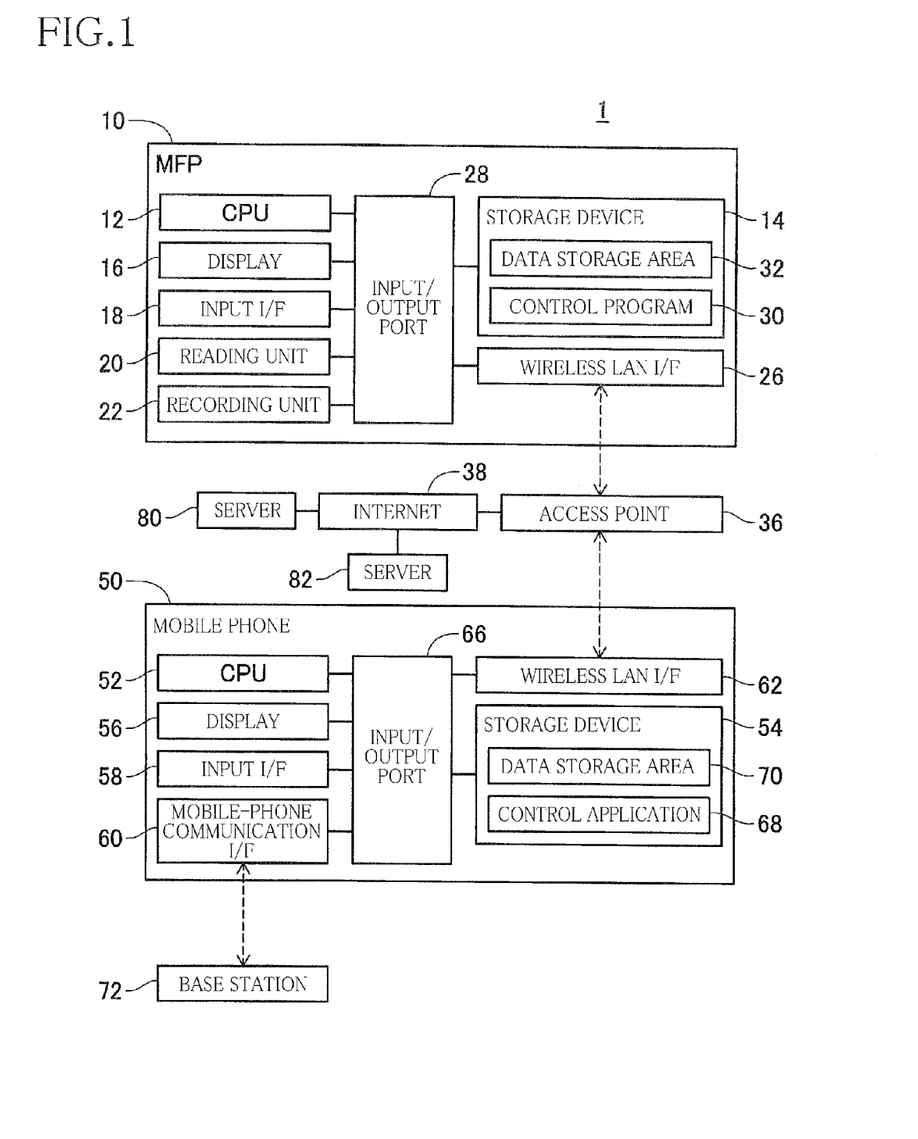
FIG. 1 is a block diagram of a communication system.

As shown in the block diagram of FIG. 1, a communication system 1 according to a first embodiment includes a multifunction peripheral (hereinafter abbreviated as "MFP") (as one example of an image recording apparatus) 10, a mobile phone (as one example of an external device) 50, and servers (each as one example of the external device) 80, 82.

The MFP 10 mainly includes a CPU (as one example of a controller and a computer) 12, a storage device 14, a display (as one example of a notifying device) 16, an input I/F (as one example of an operation device) 18, a reading unit 20, a recording unit (as one example of a recording device) 22, and a wireless LAN I/F (as one example of a communication device) 26. These devices are communicable with one another via an input/output port 28.

The CPU 12 is configured to execute processes according to a control program 30 stored in the storage device 14. The control program 30 is a program for performing various operations such as a printing operation and a scanning operation.

The storage device 14 may include at least one of random access memory (hereinafter abbreviated as "RAM"), read only memory (hereinafter abbreviated as "ROM"), flash memory, a hard disk drive (hereinafter abbreviated as "HDD"), and other similar devices. The storage device 14 has a data storage area 32 for storing data necessary for execution of the control program 30. The storage device 14 and a buffer of the CPU 12 are examples of a storage.

The display 16 is configured to display various screens according to input image data. Examples of the display 16 include a liquid crystal display and an organic electroluminescence display. However, the display 16 is not limited to these displays. The input I/F 18 may include software keys for execution of various functions of the MFP 10. For instance, the input I/F 18 may be a touch panel constituted integrally with the display 16 and may accept a user operation on an icon displayed on the display 16. The input I/F 18 may be hardware keys or other similar keys.

The reading unit 20 is configured to read an image recorded on an original and to generate image data of the image. The reading unit 20 includes a CCD image sensor, a contact image sensor, or other similar sensor. The recording unit 22 is a printing mechanism such as an electrophotographic printing mechanism. However, an printing mechanism of other type may be used as the recording unit 22.

The wireless LAN I/F 26 is configured to perform wireless communication using Wi-Fi® (registered trademark of Wi-Fi Alliance) according to IEEE 802.11 standard or any standard equivalent thereto. That is, when the MFP 10 is allowed to perform Wi-Fi (hereinafter abbreviated as "WF") wireless communication by accessing the access point 36, the MFP 10 can perform data communication with a mobile phone 50 via the access point 36. The Internet 38 is connected to the access point 36. When the MFP 10 is allowed to perform the WF wireless communication, the MFP 10 can perform data communication with severs 80, 82 via the access point 36 and the Internet 38.

The mobile phone 50 includes a CPU 52, a storage device 54, a display 56, an input I/F 58, a mobile-phone communication I/F 60, and a wireless LAN I/F 62. These devices are communicable with one another via an input/output port 66.

The CPU 52 is configured to execute processes according to a control application 68 stored in the storage device 54. The control application 68 is a program for storing image data received from the MFP 10 and for instructing the MFP 10 to perform printing based on the stored image data. Hereinafter, the CPU 52 that executes the control application 68 may be simply referred to as the name of the program. For instance, the wording "the control application 68" may include a meaning that "the CPU 52 configured to execute the control application 68".

The storage device 54 may include at least one of RAM, ROM, flash memory, a HDD, and other similar devices. The storage device 54 has a data storage area 70 for storing data necessary for execution of the control application 68.

The display 56 is configured to display various screens according to input image data. Examples of the display 56 include a liquid crystal display and an organic electroluminescence display. However, the display 56 is not limited to these displays. The input I/F 58 may include software keys for execution of various functions of the mobile phone 50. For instance, the input I/F 58 may be a touch panel constituted integrally with the display 56 and may accept a user operation on an icon displayed on the display 56. The input I/F 58 may be hardware keys or other similar keys.

The mobile-phone communication I/F 60 is configured to perform wireless communication with a base station 72 according to mobile telecommunication standards. That is, when the mobile phone 50 is allowed to perform the wireless communication according to mobile telecommunication standards, the mobile phone 50 can perform data communication via the base station 72. The wireless LAN I/F 62 is configured to perform the WF wireless communication according to IEEE 802.11 standard or any standard equivalent thereto. That is, when the mobile phone 50 is allowed to perform the WF wireless communication by accessing the access point 36, the mobile phone 50 can perform data communication with the MFP 10 via the access point 36.

Printing Operation in MFP

The MFP 10 is configured to perform a scanning operation in which the reading unit 20 reads an image recorded on an original and generates image data of the image and a printing operation in which the recording unit 22 records, on a recording sheet, the image based on the image data. The printing operation is one example of a recording operation. The printing operation performed by the MFP 10 includes a first printing operation intended by a user, i.e., a first recording operation, and a second printing operation not intended by a user, i.e., a second recording operation.

For instance, examples of the first printing operation includes: a copying operation performed when a user places an original on a flatbed or an auto document feeder (hereinafter abbreviated as "ADF") and operates a start button or other similar button of the input I/F 18; a printing operation performed based on image data transmitted by a user from the mobile phone 50 to the MFP 10; and a printing operation performed based on image data obtained from the sever 80, 82 or the mobile phone 50 by an operation on the input I/F 18.

In some case, advertising image data, e.g. coupon data, is transmitted to the MFP 10 from the sever 80, 82 of an advertising company without any instructions from the MFP 10 such that a printing operation based on the advertising image data is automatically performed. Such a printing operation is an example of the second printing operation, which is not intended by the user.

In another case, a status printing operation is automatically performed when a setting condition of the MFP 10 is changed. For instance, when the setting condition of the WF wireless communication is changed, image data of a status report describing details of the setting change is automatically generated to inform the user of the details of the setting change. The status printing operation is automatically performed based on the image data of the status report without user's operations on the input I/F 18 when a predetermined condition is satisfied. Thus, the status printing operation is another example of the second printing operation, which is not intended by the user.

In an instance where the MFP 10 finds an error such as toner empty or paper empty while the first printing operation is performed, there is displayed on the display 16 an error notifying screen for notifying the user of an occurrence of the error. Thus, the user notices the occurrence of the error, and the printing operation may be resumed when the user fixes the error. The MFP 10 is configured to perform both of the first printing operation and the second printing operation. Consequently, if the error notifying screen is kept displayed on the display 16 for a long time in both of the first and second printing operations, it may place a burden on the user.

When the MFP 10 finds the error while the first printing operation is performed, the user should have intention to fix the error and allow the first printing operation to be performed since the user desires the first printing operation completed. It is consequently preferable in this case that the error notifying screen be kept displayed on the display 16 for a long time until the error is fixed.

On the other hand, although the MFP 10 is configured to perform both of the printing operation and the scanning operation, some user uses the MFP 10 exclusively for the scanning operation. Such a user hardly uses the MFP 10 for the printing operation. Consequently, the MFP may be always kept in a state of toner empty or pater empty. However, in a case where a print job for the second printing operation is input, the error notifying screen is displayed due to toner empty or paper empty. In this case, the user needs to fix the error according to instructions displayed on the error notifying screen even though the user may not want the second printing operation completed.

Figure 2:
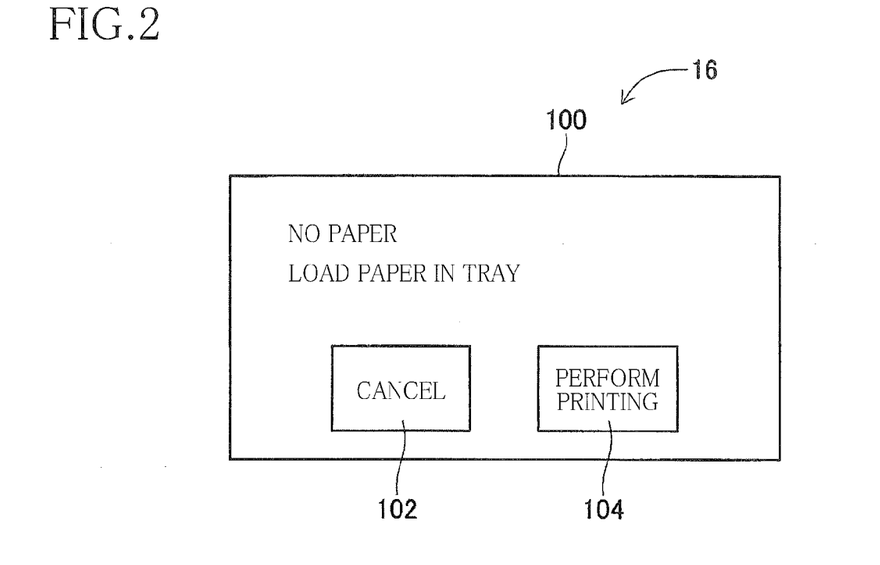
FIG. 2 is a view showing a first error notifying screen.
Figure 3:
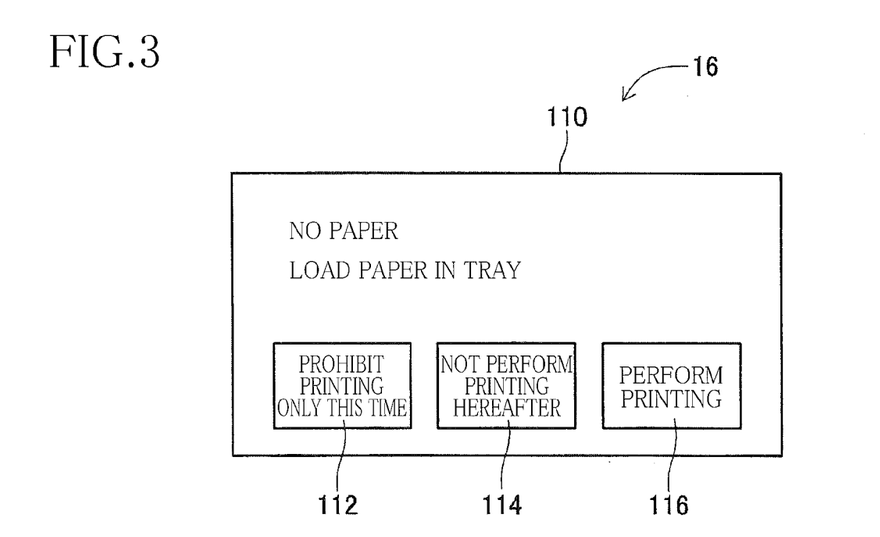
FIG. 3 is a view showing a second error notifying screen.

In view of this, the MFP 10 displays a first error notifying screen 100 on the display 16 as shown in the FIG. 2, when the input print job is a print job for the first printing operation, and the MFP 10 displays a second error notifying screen 110 on the display 16 as shown in the FIG. 3, when the input print job is a print job for the second printing operation. Specifically, when a print job is input to the MFP 10, the MFP 10 determines whether the input print job is a print job for the first printing operation, e.g., a print job that the user inputs with an explicit intention (hereinafter referred to as "intended print job" where appropriate) or a print job for the second printing operation, e.g., a print job that is input without the user's explicit intention (hereinafter referred to as "unintended print job" where appropriate).

In this determination, a print job for which a performance command is input through the input I/F 18 is determined to be the intended print job. For instance, a print job input such that the user places an original on the flatbed or the ADF and operates a start button or other similar button of the input I/F 18 is the intended print job. Further, a print job based on image data obtained from the sever 80, 82 or the mobile phone 50 by an operation on the input I/F 18 is also the intended print job.

On the other hand, a print job for printing a status of the MFP 10 is the untended print job. That is, in an instance where the status report is automatically generated after a setting value for a given setting item has been changed, a print job based on image data of the status report is the unintended print job.

In an instance where a print job, for which a performance command is not input through the input I/F 18, is transmitted from an external device via the wireless LAN I/F 26, it is determined whether the print job is the intended print job or the unintended print job based on the external device that has transmitted the print job. Specifically, in an instance where each of the mobile phone 50 and the sever 80 is the external device to allow the printing operation, and identification information thereof (e.g., device name, IP address, MAC address, serial number) is stored in advance in the data storage area 32, a print job transmitted from the mobile phone 50 or the sever 80 is determined to be the intended print job. On the other hand, in an instance where the server 82 is not the external device to allow the printing operation, and identification information thereof is not stored in the data storage area 32, a print job transmitted from the server 82 is determined to be the unintended print job.

Further, it is determined whether the print job transmitted from the external device via the wireless LAN I/F 26 is the intended print job or the unintended print job based on additional information added to the print job. Specifically, when a print job to be transmitted to the MFP 10 is generated in the mobile phone 50, for instance, there may be a case in which certain additional information is already added to the print job and the certain additional information is already stored in the MFP 10. In such a case, the print job to which the certain additional information is added, namely, the print job transmitted from the mobile phone 50, is determined to be the intended print job. On the contrary, a print job to which the certain additional information is not added is determined to be the unintended print job.

After it has been determined whether the input print job is the intended print job or the unintended print job, it is then determined whether any error that suspends performance of the printing operation in accordance with the print job is occurring or not. When it is determined that the error that suspends performance of the printing operation is not occurring, the printing operation in accordance with the input print job is performed irrespective of whether the input print job is the intended print job or the unintended print job.

When it is determined that the input print job is the intended print job and the error that suspends performance of the printing operation in accordance with the print job is occurring, a first error notifying screen 100 shown in FIG. 2 is displayed on the display 16. There are displayed, on the first error notifying screen 100, a comment notifying a cause of the occurrence of the error, a cancel button 102, and a print performing button 104. When the user desires performance of the printing operation in accordance with the print job, the user operates the print performing button 104 after having fixed the cause of the occurrence of the error, whereby the printing operation is resumed. On the other hand, when the user does not desire performance of the printing operation in accordance with the print job, the user operates the cancel button 102, whereby the printing operation is cancelled. It is noted that the first error notifying screen 100 is kept displayed on the display 16 until the cancel button 102 or the print performing button 104 is operated.

When it is determined that the input print job is the unintended print job and the error that suspends performance of the printing operation in accordance with the print job is occurring, a second error notifying screen 110 shown in FIG. 3 is displayed on the display 16. There are displayed, on the second error notifying screen 110, a comment notifying a cause of the occurrence of the error, a first button 112, a second button 114, and a third button 116. The first button 112 is a button for cancelling, only this time, performance of the printing operation in accordance with the input print job. Consequently, when the first button 112 is operated, the printing operation in accordance with the print job is cancelled.

The second button 114 is a button for cancelling the printing operation in accordance with the input print job not only this time but also hereafter. When the second button 114 is operated, the printing operation in accordance with the print job is cancelled, and specifying information that specifies the print job is stored in the data storage area 32. In an instance where the input print job is for the status printing operation, the specifying information is information for specifying the status printing operation. For example, in a case where the second error notifying screen 110 is displayed and the second button 114 is operated in the status printing operation that is performed when the setting condition of the WF wireless communication is changed, information for specifying a printing operation of the status report of the WF wireless communication is stored in the data storage area 32 as the specifying information.

In an instance where the input print job is transmitted from the external device via the wireless LAN I/F 26, information (e.g., device name, IP address, MAC address, serial number) for specifying the print job transmitted from the external device, as a transmission-source device, is the specifying information. For instance, when the second error notifying screen 110 is displayed and the second button 114 is operated in the printing operation in accordance with the print job transmitted from the server 82, information for specifying the print job transmitted from the server 82, as a transmission source, is stored in the data storage area 32 as the specifying information.

The specifying information thus stored in the data storage area 32 is used when the unintended print job is input next time and thereafter. Specifically, when it is determined that the input print job is the unintended print job and the error that disturbs performance of the printing operation in accordance with the print job is occurring, the second error notifying screen 110 shown in FIG. 3 is usually displayed on the display 16. However, when the print job is a job specified by the specifying information, the second error notifying screen 110 is not displayed on the display 16 and the printing operation in accordance with the print job is cancelled. That is, in an instance where the specifying information is stored in the data storage area 32 by operating the second button 114, the printing operation in accordance with the print job specified by the specifying information is cancelled without any operation by the user. Thus, the usability is improved.

The third button 116 is a button for performing the printing operation. When the user desires performance of the printing operation in accordance with the print job, the user operates the third button 116 after having fixed the cause of the occurrence of the error, whereby the printing operation in accordance with the print job is resumed.

It is noted that the second error notifying screen 110 is kept displayed only for a predetermined length of time, unlike the first error notifying screen 100. Consequently, when the predetermined length of time elapses after the second error notifying screen 110 has been displayed, the printing operation, the performance of which is suspended by the error that caused the second error notifying screen 110 to be displayed, is cancelled. That is, in a situation in which the second error notifying screen 110 is displayed, the printing operation, the performance of which is suspended by the error that caused the second error notifying screen 110 to be displayed, is cancelled by leaving the second error notifying screen 110 displayed for the predetermined length of time if the user does not desire the printing operation completed. It is consequently possible to reduce a burden on the user when the error occurs in the printing operation not intended by the user, namely, when the error occurs in the second printing operation.

In an instance where the first button 112 or the second button 114 is operated on the second error notifying screen 110 and the printing operation is accordingly cancelled or in an instance where the second error notifying screen 110 is kept displayed for the predetermined length of time and the printing operation is thereafter cancelled, the image data for the cancelled printing operation is transmitted to the mobile phone 50. In the MFP 10, the image data transmitted to the mobile phone 50 is deleted, and the mobile phone 50 stores the received image data in the data storage area 70.

The mobile phone 50 that stores, in the data storage area 70, the image data transmitted from the MFP 10 can allow the MFP 10 to perform the printing operation based on the image data. Specifically, the input OF 58 of the mobile phone 50 has an operation button for specifying the image data transmitted from the MFP 10 and stored in the data storage area 70 and for performing the printing operation based on the specified image data. When the operation button is operated, a print job is generated based on the image data transmitted from the MFP 10 and stored in the data storage area 70. There is added, to the print job, information indicating that the print job is the intended print job. The print job is transmitted from the mobile phone 50 to the MFP 10.

The MFP 10 that receives the print job determines whether the received print job is the intended print job or the unintended print job. As described above, the information indicative of the intended print job is added to the print job. Consequently, the MFP 10 that receives the print job determines that the received print job is the intended print job. Thus, the once cancelled printing operation is performable again in the MFP 10.

In the mobile phone 50 that stores the image data for the printing operation cancelled in the MFP 10, unnecessary image data is deleted. In the mobile phone 50, the image data transmitted from the MFP 10 as a result of cancellation of the printing operation in the MFP 10 is stored in the data storage area 70, and it is determined whether there exist any image data for an expired coupon among the stored image data. This determination is made based on information for specifying a time limit contained in the image data. When it is determined that there exist the image data for the expired coupon among the stored image data, the image data for the expired coupon is deleted from the data storage area 70.

In the mobile phone 50, it is further determined whether there exist, among the image data transmitted from the MFP 10 and stored in the data storage area 70, the same kind of image data for the status report of the status printing operation. For instance, it is determined whether a plurality of image data for the status report relating to the WF wireless communication are stored. In an instance where the plurality of image data for the status report relating to the WF wireless communication are stored, the previously stored image data for the status report other than the most recently stored image data for the status report is deleted. This determination is made based on information for specifying the status report contained in the image data and information for specifying a generation time of the image data.

In the mobile phone 50, the image data for the expired coupon and the image data for the status report that describes previous setting conditions are deleted. It is thus possible to avoid performance of an unnecessary printing operation when the printing operation based on the image data stored in the data storage area 70 is performed.

Control Program 30 and Control Application 68

Figure 4:
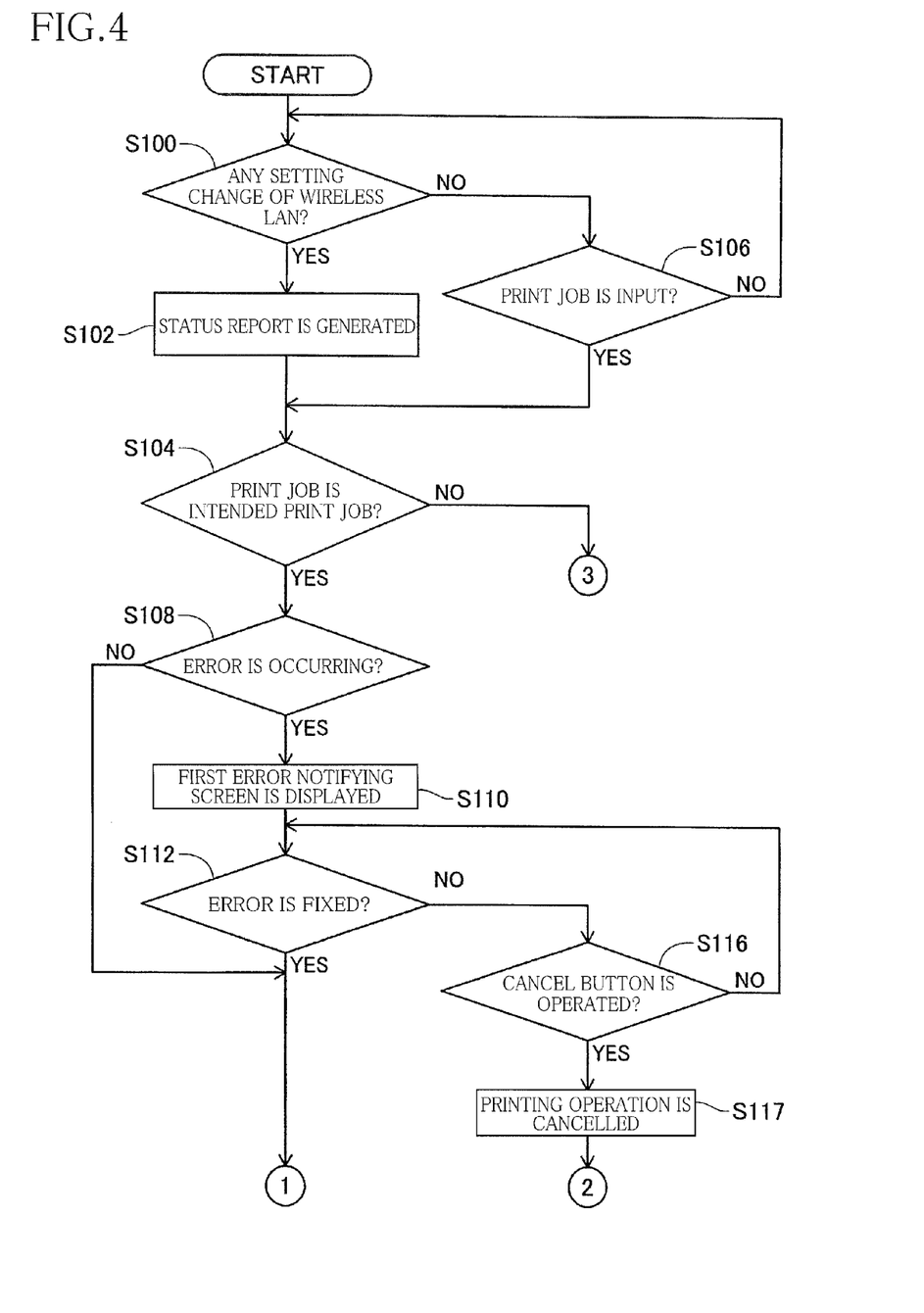
FIG. 4 is a part of a flow chart showing operations of a multifunction peripheral (MFP) according to a first embodiment.
Figure 5:
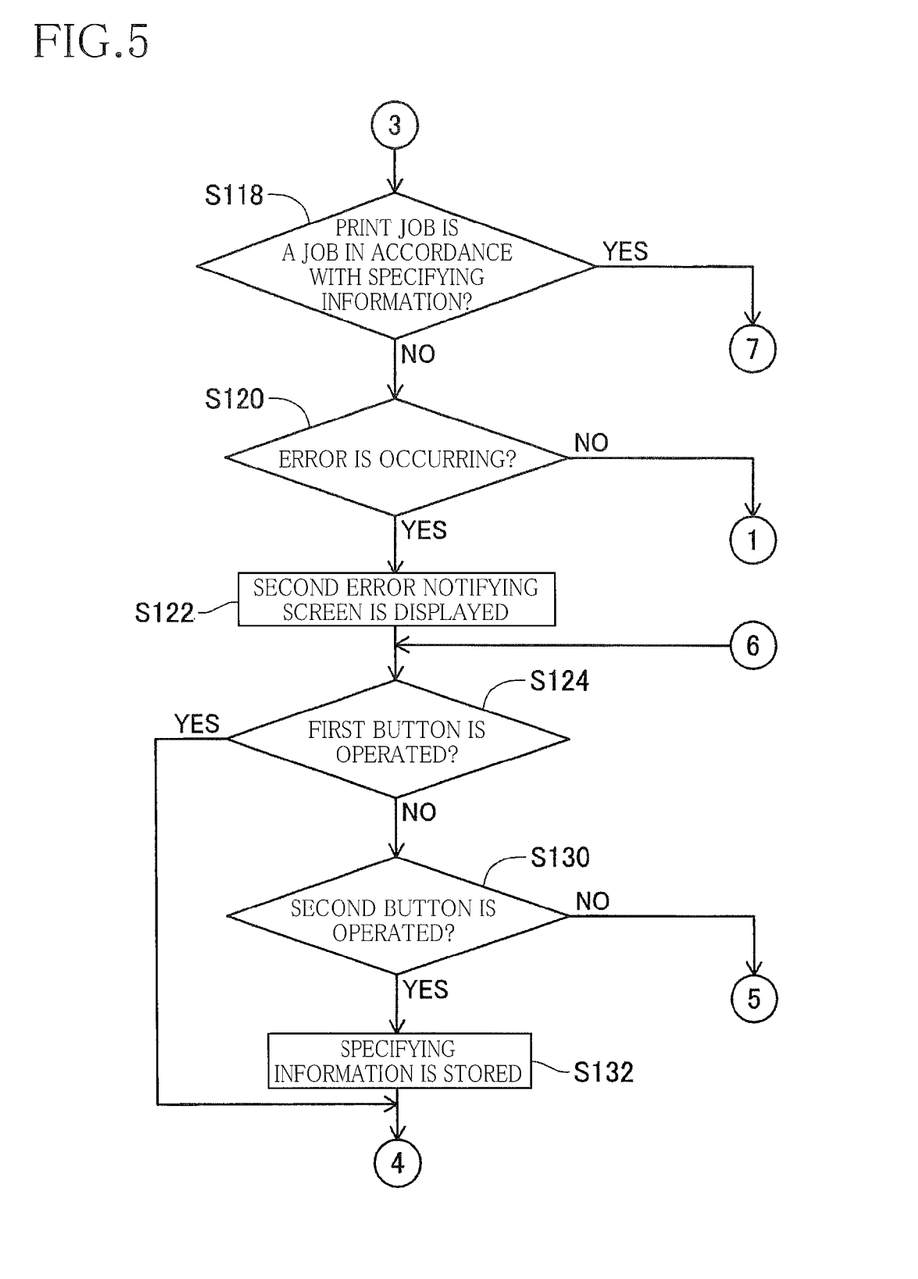
FIG. 5 is another part of the flow chart showing operations of the MFP according to the first embodiment.
Figure 6:
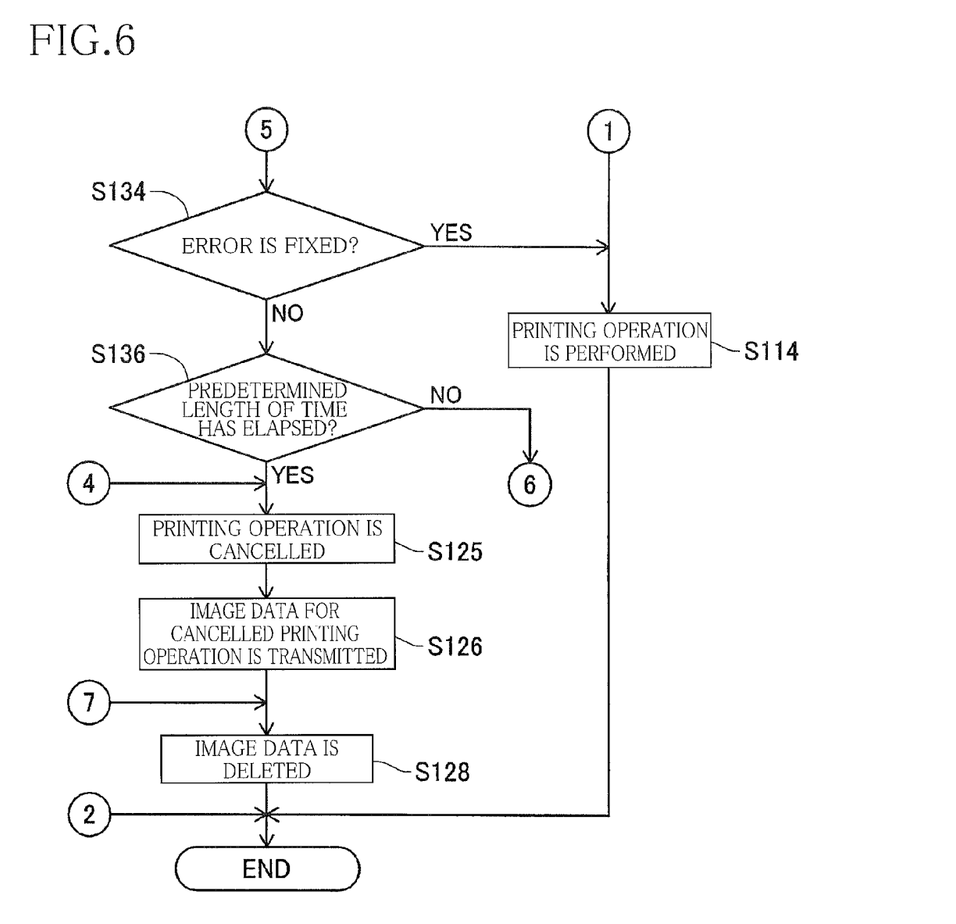
FIG. 6 is still another part of the flow chart showing operations of the MFP according to the first embodiment.

The printing operation described above is performed by execution of the control program 30 in the CPU 12 of the MFP 10. Referring to FIGS. 4-6, there will be hereinafter described a control flow when the control program 30 is executed.

When the control program 30 is started, it is initially determined by the CPU 12 whether any setting change of the wireless LAN is made, as shown in FIG. 4 (S100). When the setting change of the wireless LAN is made (S100: YES), the print job of the status report for the wireless LAN is generated (S102) and the control flow goes to S104.

On the other hand, when no setting change of the wireless LAN is made (S100: NO), it is determined by the CPU 12 whether the print job is input (S106). When the print job is not input (S106: NO), the control flow returns to S100. On the other hand, when the print job is input (S106: YES), the control flow goes to S104.

It is determined by the CPU 12 at S104 whether the print job is the intended print job or not (S104). When the print job is the intended print job (S104: YES), it is determined by the CPU 12 whether the error is occurring (S108). When it is determined that the error is not occurring (S108: NO), the printing operation is performed (S114), and processes according to the control program 30 are ended.

On the other hand, when it is determined that the error is occurring (S108: YES), the first error notifying screen 100 is displayed on the display (S110). It is subsequently determined by the CPU 12 whether the error is fixed (S112). Determining that the print performing button 104 is operated on the first error notifying screen 100 is one example of determining on S112. Determining that the shorted consumable is refilled is another example of determining on S112. Toner, paper and ink are examples of the consumables. When it is determined that the error is fixed (S112: YES), the printing operation is resumed (S114), and the processes according to the control program 30 are ended.

On the other hand, when it is determined that the error is not fixed (S112: NO), it is determined by the CPU 12 whether the cancel button 102 is operated (S116). When it is determined that the cancel button 102 is not operated (S116: NO), the control flow returns to S112. On the other hand, when it is determined that the cancel button 102 is operated (S116: YES), the printing operation is cancelled (S117), and the processes according to the control program 30 are ended.

When it is determined at S104 that the print job is not the intended print job, namely, the print job is the unintended print job (S104: NO), it is determined by the CPU 12 whether the print job is a job in accordance with the specifying information stored in the data storage area 32 (S118). When it is determined that the print job is not the job in accordance with the specifying information (S118: NO), it is determined by the CPU 12 whether the error is occurring (S120). When it is determined that the error is not occurring (S120: NO), the printing operation is performed (S114), and the processes according to the control program 30 are ended.

On the other hand, when it is determined that the error is occurring (S120: YES), the second error notifying screen 110 is displayed on the display 16 (S122). It is subsequently determined by the CPU 12 whether the first button 112 is operated on the second error notifying screen 110 (S124). When it is determined that the first button 112 is operated (S124: YES), the printing operation is cancelled (S125). Subsequently, the image data for the cancelled printing operation is transmitted to the mobile phone 50 (S126), and the image data is deleted from the data storage area 32 (S128). Thus, the processes according to the control program 30 are ended.

On the other hand, when it is determined at S124 that the first button 112 is not operated on the second error notifying screen 110 (S124: NO), it is determined by the CPU 12 whether the second button 114 is operated (S130). When it is determined that the second button 114 is operated (S130: YES), the specifying information is stored in the data storage area 32 (S132), and the processes at S125 and subsequent steps are executed.

When it is determined at S130 that the second button 114 is not operated on the second error notifying screen 110 (S130: NO), it is determined by the CPU 12 whether the error is fixed (S134). When it is determined that the error is fixed (S134: YES), the printing operation is resumed (S114), and the processes according to the control program 30 are ended. Determining that the third button 116 is operated is one example of determining on S134. Determining that the shorted consumable is refilled is another example of determining on S134.

On the other hand, when it is determined that the error is not fixed (S134: NO), it is determined by the CPU 12b whether a predetermined length of time has elapsed since the second error notifying screen 110 was displayed on the display 16 (S136). When it is determined that the predetermined length of time has not yet elapsed after the second error notifying screen 110 was displayed (S136: NO), the control flow returns to S124. On the other hand, when it is determined that the predetermined length of time has elapsed since the second error notifying screen 110 was displayed (S136: YES), the processes at S125 and subsequent steps are executed.

When it is determined at S118 that the print job is the job specified by the specifying information (S118: YES), the image data is deleted (S128), and the processes according to the control program 30 are ended.

Figure 7:
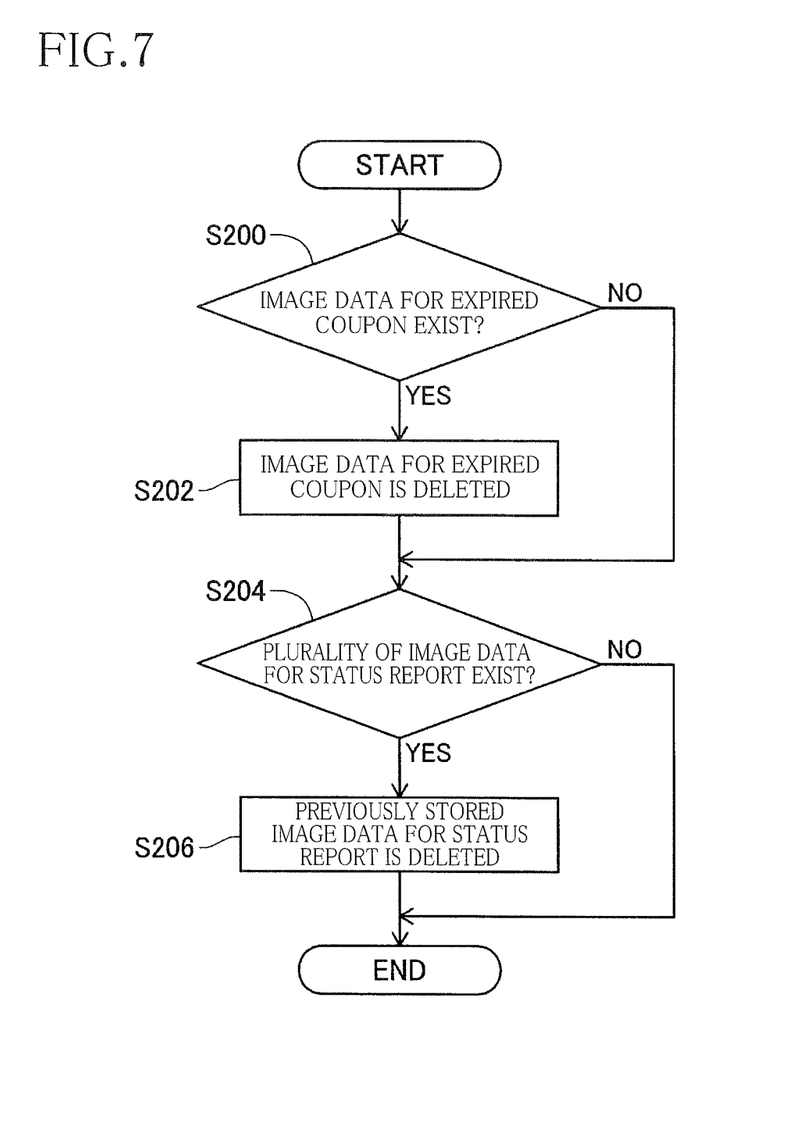
FIG. 7 is a flow chart showing operations of a mobile phone according to the first embodiment.

The above-indicated deleting process for deleting unnecessary image data is executed by execution of the control application 68 in the CPU 52 of the mobile phone 50. Referring next to FIG. 7, there will be described a control flow when the control application 68 is executed.

When the control application 68 is executed, it is initially determined by the CPU 52 whether there exists image data for at least one expired coupon among the image data stored in the data storage area 70, as shown in FIG. 7 (S200). When it is determined that the image data for the at least one expired coupon exists among the image data stored in the data storage area 70 (S200: YES), the image data for the at least one expired coupon is deleted (S202), and the control flow goes to S204. On the other hand, when it is determined that the image data for the at least one expired coupon does not exist among the stored image data (S200: NO), S202 is skipped and the control flow goes to S204.

The CPU 52 determines at S204 whether there exist a plurality of image data for the status report among the image data stored in the data storage area 70 (S204). When the plurality of image data for the status report exist among the stored image data (S204: YES), the previously stored image data for the status report other than the most recently stored image data for the status report is deleted (S206). Thus, the processes according to the control application 68 are ended. On the other hand, when the plurality of image data for the status report do not exist among the stored image data (S204: NO), S206 is skipped and the processes according to the control application 68 are ended.

The process at S102 is one example of a generating process. The process at S104 is one example of a first determining process. The processes at S108, S120 are one example of a second determining process. The process at S110 is one example of a first notifying process. The process at S122 is one example of a second notifying process. The process at S125 is one example of a cancelling process. The process at S126 is one example of a transmission process. The process at S132 is one example of a first storage process.

Figure 8:
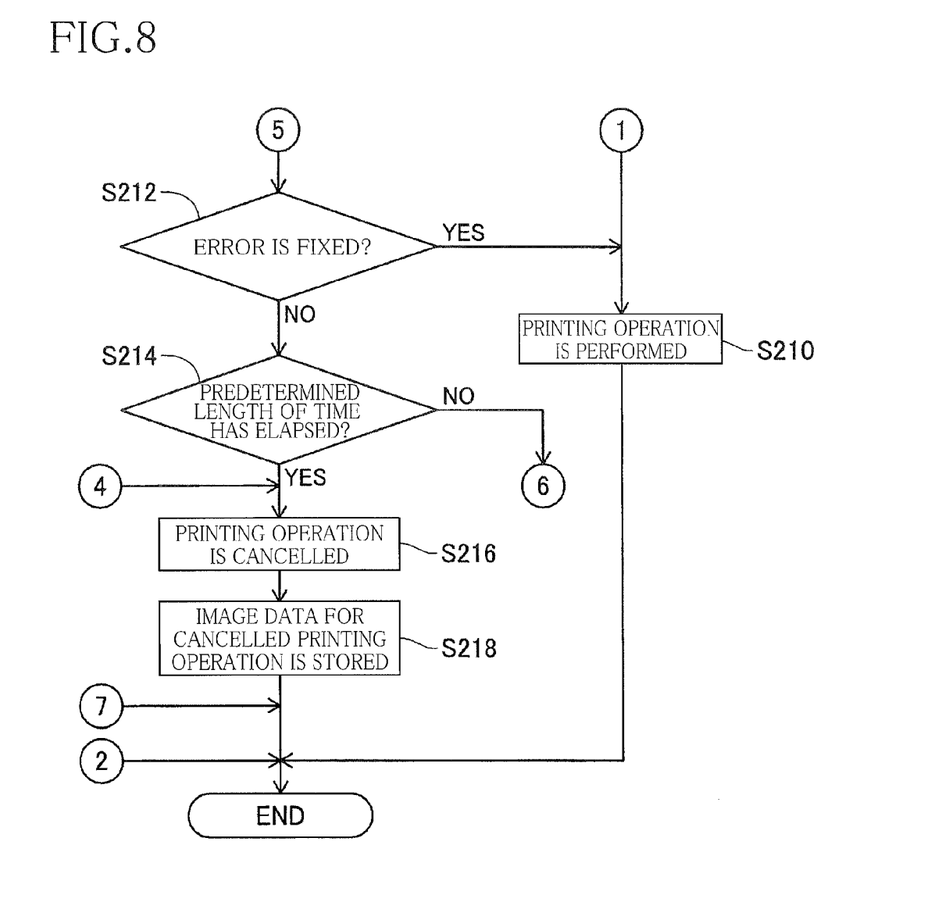
FIG. 8 is a flow chart showing operations of the MFP according to a second embodiment.

There will be next described operations of the MFP 10 according to a second embodiment. Since the MFP 10 of the second embodiment is identical in configuration with the MFP 10 of the first embodiment, a detailed explanation of the MFP 10 of the second embodiment is dispensed with.

In the MFP 10 of the first embodiment, the image data for the cancelled printing operation is transmitted to the mobile phone 50. In the MFP 10 of the second embodiment, the image data for the cancelled printing operation is stored in the data storage area 32 of the MFP 10. That is, in an instance where the first button 112 or the second button 114 is operated on the second error notifying screen 110 and the printing operation is accordingly cancelled or in an instance where the second error notifying screen 110 is displayed for the predetermined length of time and the printing operation is thereafter cancelled, the image data for the cancelled printing operation is stored in the data storage area 32. Thus, the once cancelled printing operation is performable again in the MFP 10.

In an instance where an image based on the image data stored in the data storage area 32 as a result of cancellation of the printing operation is printed, a print job based on the image data is determined to be the intended print job as in the illustrated first embodiment. Further, unnecessary image data stored in the data storage area 32 is deleted in the MFP 10 as in the mobile phone 50 of the illustrated first embodiment.

Referring to FIG. 8, there will be explained a control flow when the control program 30 is executed in the CPU 12 of the MFP 10 for executing the processes according to the second embodiment. The control flow executed in the CPU 12 of the MFP 10 of the second embodiment includes processes common to those in the control flow executed in the CPU 12 of the MFP 10 of the first embodiment, and the common processes will be briefly explained. Further, processes corresponding to those in FIGS. 4 and FIG. 5 and executed in the CPU 12 of the MFP 10 of the second embodiment are the same as the processes executed in the CPU 12 of the MFP 10 of the first embodiment. In view of this, the corresponding processes executed in the CPU 12 of the MFP 10 of the second embodiment will be explained referring to FIGS. 4 and 5.

When the control program 30 is started in the MFP 10 of the second embodiment, the processes at S100-S132 in FIGS. 4 and 5 are executed. In this instance, when it is determined at S112 that the error is fixed (S112: YES) or when it is determined at S120 that the error is not occurring (S120: NO), the printing operation is performed (S210) and the processes according to the control program 30 are ended, as shown in FIG. 8.

When it is determined at S130 that the second button 114 on the second error notifying screen 110 is not operated (S130: NO), processes at S212-S216 are executed, as shown in FIG. 8. The processes at S212-S216 are the same as the processes at S134-S125 in FIG. 6, and explanation of which is dispensed with. After S216, the image data for the cancelled printing operation is stored in the data storage area 32 (S218). Thus, the processes according to the control program 30 are ended.

The process at S216 is one example of the cancelling process. The process at S218 is one example of a second storage process.

The image data for the cancelled printing operation is stored in the data storage area 32 of the MFP 10, and unnecessary image data among the stored image data is deleted. The deleting process for deleting the unnecessary image data is executed by execution of the control program 30 in the CPU 12 of the MFP 10. The control flow executed in the deleting process is the same as the control flow shown in FIG. 7, and its illustration and explanation are dispensed with.

The same step as step S202 in FIG. 7 is one example of a first deletion process. The same step as S206 of FIG. 7 is one example of a second deletion process.

Modifications

It is to be understood that the disclosure is not limited to the details of the illustrated embodiments, but may be embodied with various changes and modifications, which may occur to those skilled in the art, without departing from the spirit and scope of the disclosure. In the illustrated embodiments, the occurrence of the error is displayed on the display 16 so as to notify the occurrence of the error to the user. The occurrence of the error may be notified to the user in other forms such as sound and light.

In the illustrated embodiments, it is determined whether the input print job is the intended print job or the unintended print job, and it is thereafter determined whether or not the error that suspends performance of the printing operation in accordance with the print job is occurring. The two determinations may be made concurrently. Further, it may be first determined whether the error is occurring, and thereafter it may be determined whether the print job is the intended print job or the unintended print job when it is determined that the error is occurring.

While the processes shown in FIGS. 4-8 are executed by the CPU 12 in the illustrated embodiments, these processes need not be executed by the CPU 12. For instance, these processes may be executed by an ASIC or other logic integrated circuit or may be executed by cooperation of the CPU, the ASIC, and the logic integrated circuit.

Advantageous Effects

In the MFP 10 according to the illustrated embodiment, it is determined whether the printing operation to be performed is the first printing operation intended by the user or the second printing operation not intended by the user. It is further determined whether an error that suspends performance of the printing operation is occurring. When it is determined that the printing operation to be performed is the first printing operation and the error is occurring, the occurrence of the error is kept notified until the error is fixed. In this instance, after the error has been fixed, the printing operation is resumed. On the other hand, when it is determined that the printing operation to be performed is the second printing operation and the error is occurring, the occurrence of the error is kept notified for the predetermined length of time. After the occurrence of the error has been kept notified for the predetermined length of time, the printing operation, the performance of which was suspended by the occurrence of the error, is cancelled. In the MFP 10, the manner of notification of the error is varied depending upon the printing operation to be performed. In an instance where the printing operation to be performed is important, the occurrence of the error is kept notified until the error is fixed, whereby it is possible to notify the user of the occurrence of the error with high reliability. In contrast, in an instance where the printing operation to be performed is not important, the printing operation, the performance of which was suspended by the occurrence of the error, can be cancelled after the occurrence of the error has been kept notified for the predetermined length of time. It is consequently possible to enhance usability of the MFP 10 in the event of the occurrence of the error.

What is claimed is:

1. An image recording apparatus, comprising:
   a recording device configured to record, on a recording sheet, an image based on image data;
   a notifying device configured to notify an occurrence of an error by generating at least one of a visual notification and an audio notification; and
   a controller,
   wherein the controller is configured to execute:
      a recording-operation performing process in which a recording operation of the image is performed by the recording device according to a recording command for the image;
      a first determining process in which it is determined whether the recording operation to be performed in the recording-operation performing process is a first recording operation or a second recording operation;
      a second determining process in which it is determined whether an error that suspends performance of the recording operation of the image by the recording device is occurring, the error being an error which will be fixed by a user of the image recording apparatus;
      a first notifying process in which, when it is determined in the first determining process that the recording operation to be performed is the first recording operation and it is determined in the second determining process that the error is occurring, the occurrence of the error is kept notified by the notifying device until the error is fixed;
      a second notifying process in which, when it is determined in the first determining process that the recording operation to be performed is the second recording operation and it is determined in the second determining process that the error is occurring, the occurrence of the error is kept notified by the notifying device for a predetermined length of time; and
      a cancelling process in which the recording operation, the performance of which was suspended by the occurrence of the error, is cancelled after the occurrence of the error has been kept notified for the predetermined length of time by the notifying device, the cancelling process being executed in a state in which the occurrence of the error has been kept notified by the notifying device in the second notifying process, and
   wherein the suspended recording operation of the image is resumed, on condition that the error is fixed in a time period during which the occurrence of the error is kept notified by the notifying device in the first notifying process or the second notifying process.

2. The image recording apparatus according to claim 1, further comprising an operation device through which an input according to a user operation is input,
   wherein, when the recording command for the image is received from the operation device, it is determined in the first determining process that the recording operation to be performed according to the recording command in the recording-operation performing process is the first recording operation.

3. The image recording apparatus according to claim 1, further comprising a communication device configured to perform communication with an external device,
   wherein, when the recording command for the image is received via the communication device, it is determined in the first determining process whether the recording operation to be performed in the recording-operation performing process is the first recording operation or the second recording operation based on the external device from which the recording command is transmitted.

4. The image recording apparatus according to claim 1, wherein it is determined in the first determining process whether the recording operation to be performed in the recording-operation performing process is the first recording operation or the second recording operation, based on additional information added to the image data for the image to be recorded on the recording sheet in the recording operation.

5. The image recording apparatus according to claim 1, further comprising an operation device through which an input according to a user operation is input,
   wherein, when a predetermined condition is satisfied without receiving an input from the operation device, the controller executes a generating process in which is generated image data for recording an image indicative of a status of the image recording apparatus on the recording sheet, and
   wherein it is determined in the first determining process that the recording operation of the, image based on the image data generated in the generating process is the second recording operation.

6. The image recording apparatus according to claim 1, further comprising: an operation device through which an input according to a user operation is input; and a storage,
   wherein, when an input instructing not to hereafter perform the recording operation, the performance of which was suspended by the occurrence of the error, is received from the operation device in the time period during which the occurrence of the error is kept notified in the second notifying process, the controller executes a first storage process in which specifying information for specifying the recording operation instructed not to be performed hereafter is stored in the storage, and wherein, when the recording operation to be performed according to the recording command in the recording-operation performing process is the recording operation specified by the specification information stored in the storage in the first storage process, the recording operation to be performed according to the recording command is not performed.

7. The image recording apparatus according to claim 1, further comprising a communication device configured to perform communication with an external device,
wherein, when the recording operation, the performance of which was suspended, is cancelled in the cancelling process, the controller executes a transmission process in which the image data, based on which the image was supposed to be recorded on the recording sheet in the cancelled recording operation, is transmitted to the external device via the communication device, and
wherein, when the image data transmitted in the transmission process is received from the external device, it is determined in the first determining process that the recording operation of the image based on the image data is the first recording operation.

8. The image recording apparatus according to claim 1, further comprising: an operation device through which an input according to a user operation is input; and a storage,
wherein, when the recording operation, the performance of which was suspended, is cancelled in the cancelling process, the controller executes a second storage process in which the image data, based on which the image was supposed to be recorded on the recording sheet in the cancelled recording operation, is stored in the storage, and
wherein, when the operation device receives a user operation instructing to select the image data stored in the storage in the second storage process as the image data for the recording operation to be performed, it is determined in the first determining process that the recording operation of the image based on the selected image data is the first recording operation.

9. The image recording apparatus according to claim 8, wherein, when the image data stored in the storage in the second storage process contains information indicating a time limit, the controller executes a first deletion process in which the image data containing the information is deleted on condition that the time limit passes.

10. The image recording apparatus according to claim 8, further comprising an operation device through which an input according to a user operation is input,
wherein, when a predetermined condition is satisfied without receiving an input from operation device, the controller executes a generating process in which is generated image data for recording an image indicative of a status of the image recording apparatus on the recording sheet, and
wherein, when a plurality of pieces of image data generated in the generating process at different timing are already stored in the storage, the controller executes a second deletion process in which all of the image data other than the most recently generated image data are deleted.

11. A non-transitory storage medium storing a plurality of instructions executable by a computer of an image recording apparatus, the image recording apparatus comprising a recording device configured to record, on a recording sheet, an image based on image data; a notifying device configured to notify an occurrence of an error by generating at least one of a visual notification and an audio notification; and a controller,
the plurality of instructions, when executed by the computer, causing the controller to perform:
a recording-operation performing process in which a recording operation of the image is performed by the recording device according to a recording command for the image;
a first determining process in which it is determined whether the recording operation to be performed in the recording-operation performing process is a first recording operation or a second recording operation;
a second determining process in which it is determined whether an error that suspends performance of the recording operation of the image by the recording device is occurring the error being an error which will be fixed by a user of the image recording apparatus;
a first notifying process in which, when it is determined in the first determining process that the recording operation to be performed is the first recording operation and it is determined in the second determining process that the error is occurring, the occurrence of the error is kept notified by the notifying device until the error is fixed;
a second notifying process in which, when it is determined in the first determining process that the recording operation to be performed is the second recording operation and it is determined in the second determining process that the error is occurring, the occurrence of the error is kept notified by the notifying device for a predetermined length of time; and
a cancelling process in which the recording operation, the performance of which was suspended by the occurrence of the error, is cancelled after the occurrence of the error has been kept notified for the predetermined length of time by the notifying device, the cancelling process being executed in a state in which the occurrence of the error has been kept notified by the notifying device in the second notifying process, and
wherein the suspended recording operation of the image is resumed, on condition that the error is fixed in a time period during which the occurrence of the error is kept notified by the notifying device in the first notifying process or the second notifying process.

12. An image recording apparatus, comprising:
a recording device configured to record, on a recording sheet, an image based on image data;
a notifying device configured to notify an occurrence of an error by generating at least one of a visual notification and an audio notification; and
a controller,
wherein the controller is configured to execute:
a recording-operation performing process in which a recording operation of the image is performed by the recording device according to a recording command for the image;
a first determining process in which it is determined whether the recording operation to be performed in the recording-operation performing process is a first recording operation or a second recording operation;
a second determining process in which it is determined whether an error that suspends performance of the recording operation of the image by the recording device is occurring, the error being an error which will be fixed by a user of the image recording apparatus;

a notifying process in which, when it is determined in the second determining process that the error is occurring, the occurrence of the error is kept notified by the notifying device;

a third determining process in which it is determined whether the error has been fixed;

a resuming process in which the recording operation, the performance of which was suspended by the occurrence of the error, is resumed when it is determined in the third determining process that the error has been fixed; and a cancelling process in which the recording operation, the performance of which was suspended by the occurrence of the error, is cancelled when it is determined in the first determining process that the recording operation to be performed in the recording-operation performing process is the second recording operation and after the occurrence of the error has been kept notified for the predetermined length of time by the notifying device.

13. The image recording apparatus according to claim 12, further comprising: an operation device through which an input according to a user operation is input;

wherein, it is determined in the third determining process that the error has been fixed, when an input indicating the error has been fixed is received from the operation device.

14. The image recording apparatus according to claim 13, the input indicating the error has been fixed is an input instructing to resume the recording operation, the performance of which was suspended by the occurrence of the error.

* * * * *

UNITED STATES PATENT AND TRADEMARK OFFICE
CERTIFICATE OF CORRECTION

| | | |
|---|---|---|
| PATENT NO. | : 9,575,695 B2 | Page 1 of 1 |
| APPLICATION NO. | : 15/044246 | |
| DATED | : February 21, 2017 | |
| INVENTOR(S) | : Yui Kamma | |

It is certified that error appears in the above-identified patent and that said Letters Patent is hereby corrected as shown below:

In the Claims

Column 14, Claim 5, Line 53 should read: that the recording operation of the image based on the Signed and Sealed this
Fifth Day of September, 2017

Joseph Matal
*Performing the Functions and Duties of the*
*Under Secretary of Commerce for Intellectual Property and*
*Director of the United States Patent and Trademark Office*